(No Model.) 3 Sheets—Sheet 1.
J. N. HIERONYMUS.
MACHINE FOR SHOCKING SHEAVES OF SMALL GRAIN.

No. 402,449. Patented Apr. 30, 1889.

Witnesses,  
F. H. Schott  
W. L. Boyden

Inventor.  
Jasper N. Hieronymus  
By his Attorney (No Model.) J. N. HIERONYMUS. 3 Sheets—Sheet 2.
MACHINE FOR SHOCKING SHEAVES OF SMALL GRAIN.
No. 402,449. Patented Apr. 30, 1889.
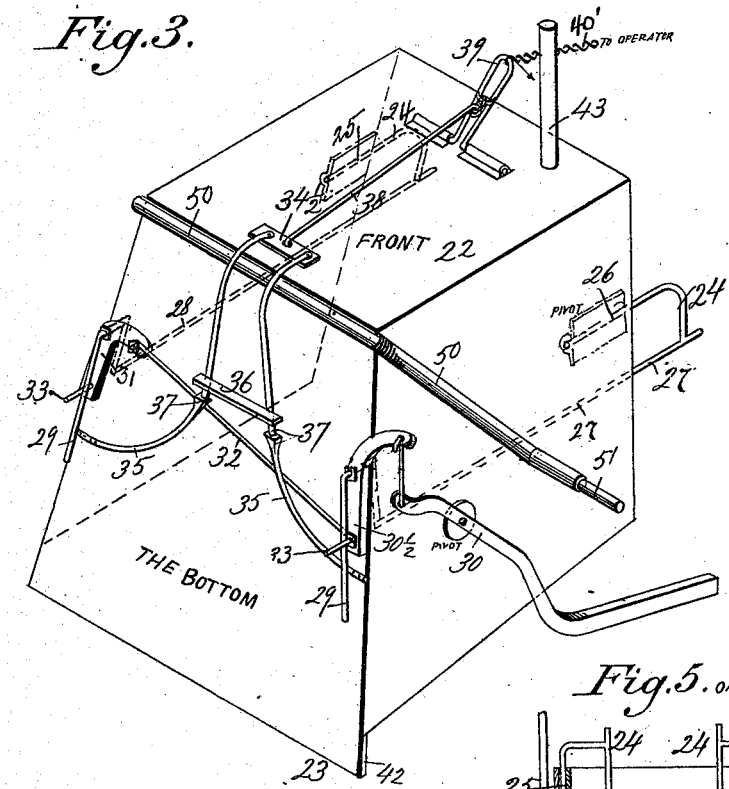
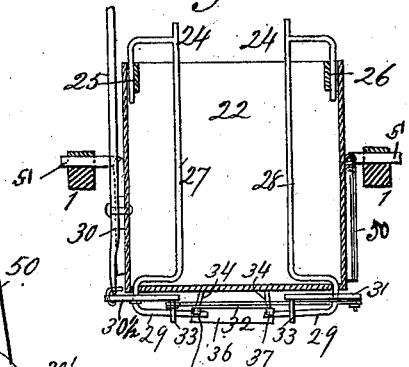
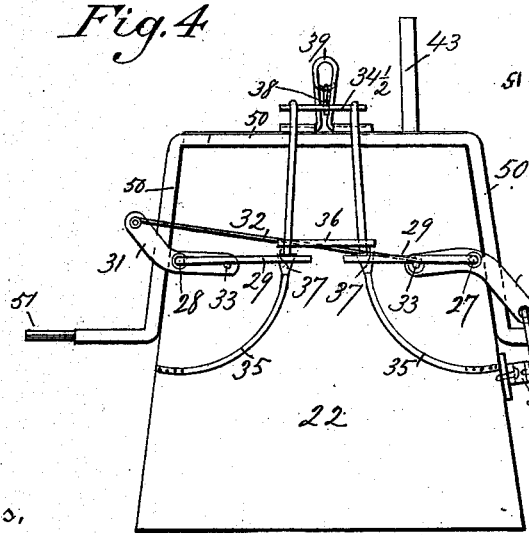
Witnesses,
F. H. Schott
W. L. Boyden
Inventor.
Jasper N. Hieronymus
By his Attorney (No Model.) 3 Sheets—Sheet 3.
J. N. HIERONYMUS.
MACHINE FOR SHOCKING SHEAVES OF SMALL GRAIN.
No. 402,449. Patented Apr. 30, 1889.
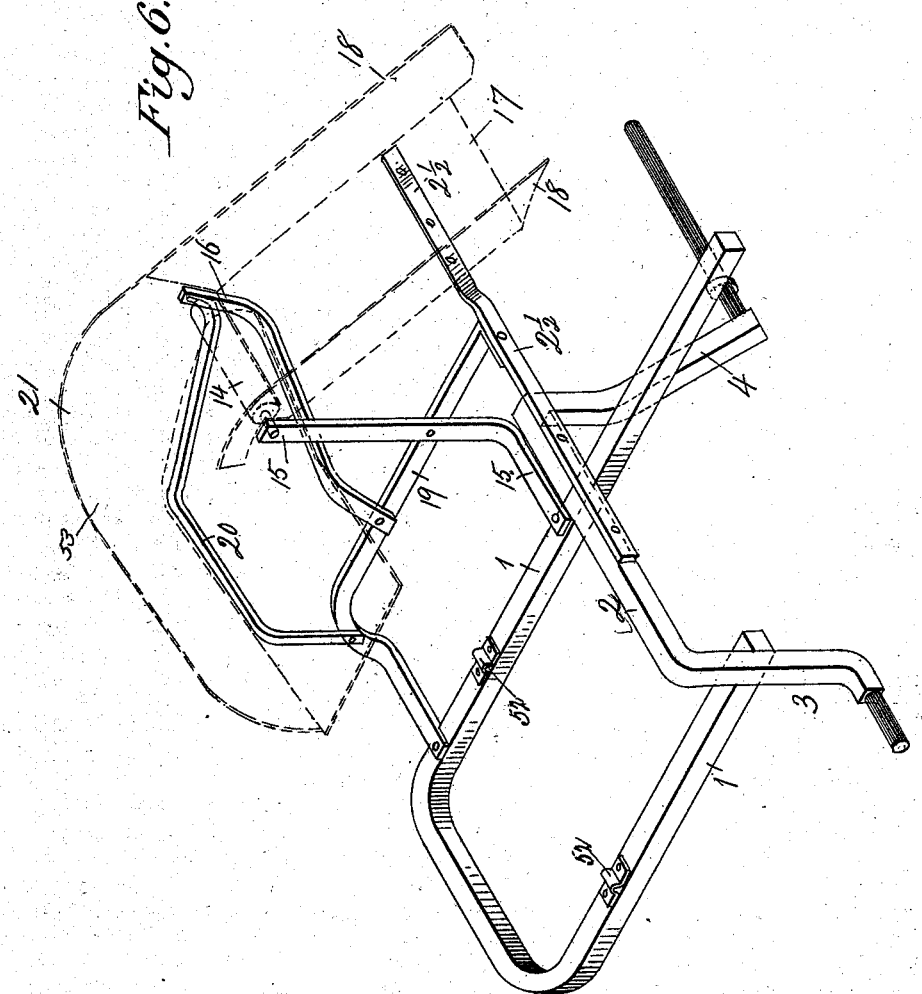
Witnesses
F. H. Schott
Newton Cranford
Inventor.
Jasper N. Hieronymus
By his Attorney
W. H. Ruff

UNITED STATES PATENT OFFICE.

JASPER N. HIERONYMUS, OF FAIRBURY, ILLINOIS.

MACHINE FOR SHOCKING SHEAVES OF SMALL GRAIN.

SPECIFICATION forming part of Letters Patent No. 402,449, dated April 30, 1889.

Application filed May 3, 1888. Serial No. 272,644. (No model.)

*To all whom it may concern:*

Be it known that I, JASPER N. HIERONYMUS, of Fairbury, in the county of Livingston, and in the State of Illinois, have invented certain new and useful Improvements in a Machine for Shocking Sheaves of Small Grain; and I do hereby declare that the following is a full, clear, and exact description thereof, reference being had to the accompanying drawings, and to the letters of reference marked thereon, making a part of this specification.

My invention relates to an improvement in machines for shocking grain, the object of the same being to provide a machine of this character adapted to pick the sheaves from the ground and convey them to a suitable shocking-box, where they may be compressed together near their heads, thereby forming a shock which may be dropped to the ground in such condition.

A further object is to provide a machine of the above character which shall be simple and economical in construction and durable and efficient in use; and with these ends in view my invention consists in the certain features of construction and combinations of parts, as will be hereinafter fully described, and pointed out in the claims.

Figure 1:
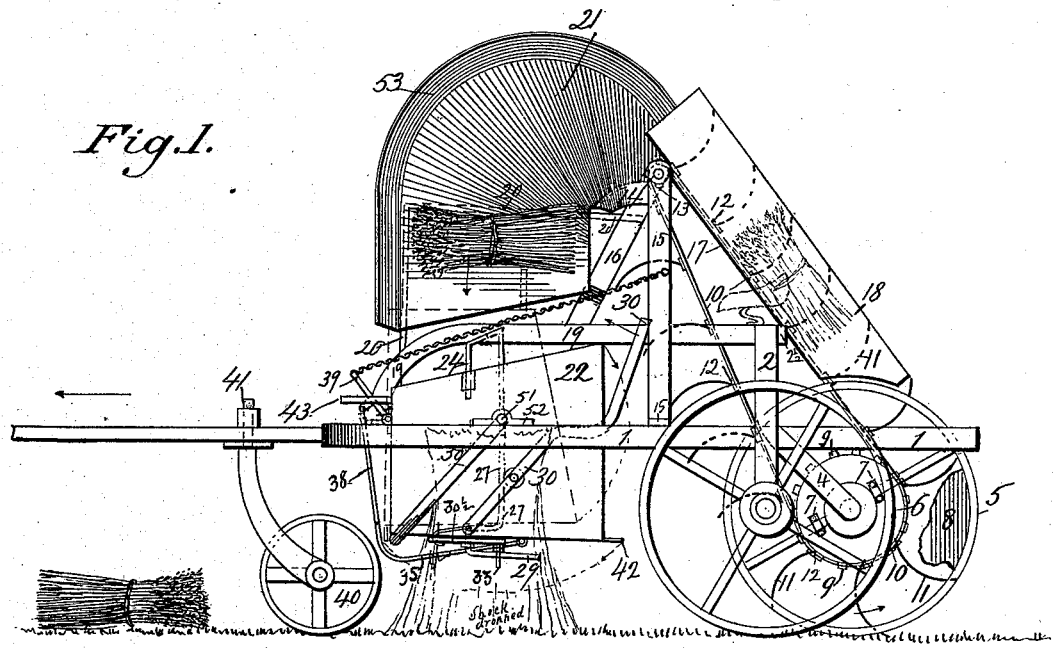
Figure 2:
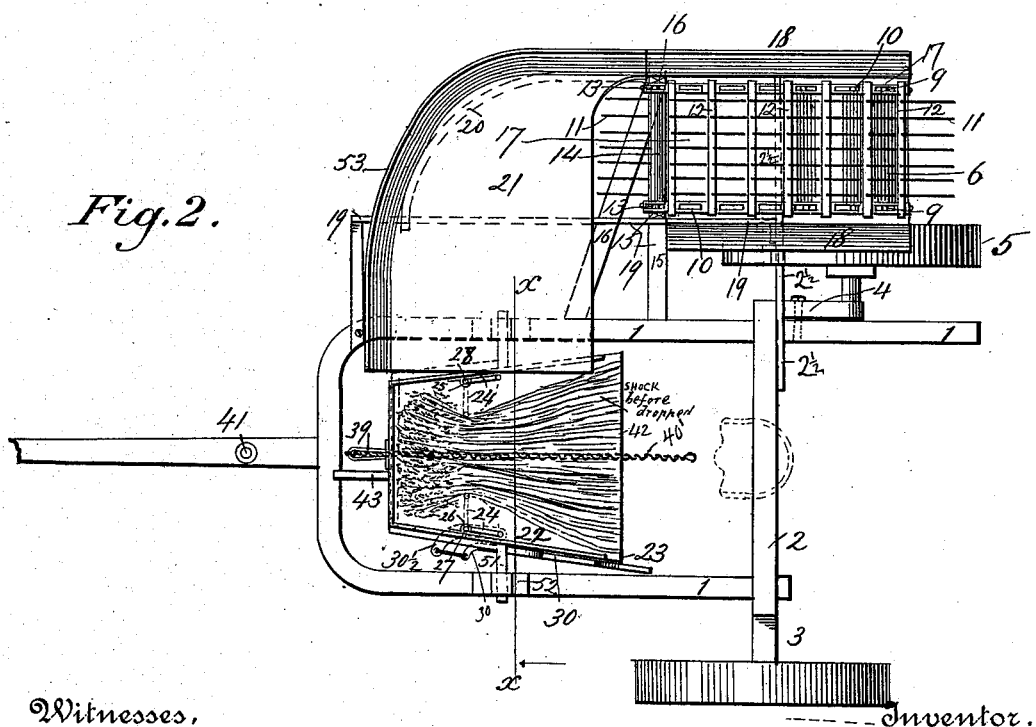

In the accompanying drawings, Figure 1 is a view of the machine in side elevation. Fig. 2 is a top plan view thereof. Fig. 3 is a perspective view of the shocking-box, and Fig. 4 is a bottom plan view of the shocking-box. Fig. 5 is a cross-section of the shocking-box, taken on line $x$ $x$ of Fig. 2. Fig. 6 is a perspective view of the frame-work and cranked axle-bar of the machine with some additional parts in dotted lines.

1 represents the main supporting-frame of the machine, to which is secured the cranked bar 2, carrying the axle-bearings 3 and 4, the latter being bent rearwardly, as shown in Fig. 6, and carrying the wheel 5, to which is secured the drum 6 by means of clips 7, secured to the drum and spokes of said wheel. To the under side of the rim of wheel 5 on the outer side is secured the guard 8, to prevent the sheaves from catching in the spokes thereof. The drum is provided on each end with the sprockets 9, to receive the sprocket-chains 10, carrying the cross-pieces 12, provided with tines 11, the said tines being curved, as shown, and rigidly secured to the cross-pieces 12, which connect the said chains. The chains also pass around the sprockets 13 on the roller 14, the latter being journaled in bearings formed in the standards 15 and 16, which project from the frame 1 and beam 19, respectively, as shown in Fig. 6. To the standards 15 and 16 and the bar $2\frac{1}{2}$, which projects from the beam 19 and forms a support, is attached the bed 17 in any suitable manner, the same being provided on each side with flaring shields 18 to insure the guidance of the sheaves. The bed 17 extends upward and forward at a suitable inclination and forms a carrier-way which helps to support the tine-bars with their sheaves, and also serves as a complete bottom through which straw or other material cannot pass as it is being elevated to the table.

To the frame 1 is secured the beam 19, to which is attached the vertical and laterally-extending arm 20, the opposite end thereof being made fast to the standard 16.

To the arm 20 and the standard 16 is secured the table 21, adjacent to the end of bed 17 and at right angles thereto, the table being inclined downward, in order that the sheaves may easily slide and drop into the shocking-box 22. This table is substantially of a rectangular form with a curved upper end and is provided with the upwardly-flaring rim 53 on its outer edge to prevent the sheaves from falling off as they slide down said table to the shocking-box.

The shocking-box is pivotally hung upon and in the frame 1, the inner sides thereof being directly beneath the end of the table, and is constructed of any suitable material. This box is suspended from the main frame 1 by the cranked rod 50, which has journals 51 at each end, which turn in boxes 52 on said frame. The cranked rod answers both as a support and also to strengthen the box, and passes around the bottom of the box near its front end and well up the sides, to which it is secured. The box converges at the front end and inclines at its rear end, 23, and is provided on the sides in the inside near the front end with the compressing-wings 24, which are pivoted therein, as shown at 25 and 26, Fig. 5. The rods 27 and 28 of the wings pass through the bottom of the box and are bent under the box, forming the arms 29. To the outside of the box is pivoted the lever 30, which is connected with the bell-crank lever 30½, the latter being pivotally secured on the rod 27.

To the rod 28 is pivoted a similar lever, 31, the opposite ends of the two being connected by means of the rod 32. The free ends of the levers are provided with the stud-pins 33, adapted to engage the outer sides of the arms 29. Thus it will be seen that when the lever 30 is pressed forward the arms 29 will be carried inward in the same direction, and as there will be a counter-pressure upon the arms, owing to the wings striking the sheaves, a spring locking device is provided, which consists of the branching spring-arms 35, rigidly secured to the bottom of the box, the said arms being connected by means of the rod 36, to release the arms on wings, and are provided with the notches 37, in which the arms 29 lock. To the upper end of the arms 35, which are fastened to a cross-bar, 34½, is pivoted the rod 38, the opposite end being secured to the pivoted lever 39.

The front wheel, 40, is suitably pivoted in the tongue at 41.

Having described the construction of my invention, I will proceed to describe its operation.

The sheaves of grain are picked up by the tines 11, which are moved in the direction of the arrow, Fig. 1, by means of the cross-bars 12 and driving-chains 10, and carried to the table 21, upon which they will drop with the heads of the grain forward, as shown in Fig. 1. The table being inclined, the sheaves will naturally slide therefrom into the shocking-box 22, with the heads pointing as shown in Fig. 2. When the box is filled, the operator, whose seat is on bar 2, by pushing the lever 30 forward will cause the wings 24 to move forward against the grain, thereby compressing the sheaves together and causing the arms 29 to bear against the arms 35, and finally to lock in the notches 37. The filled box is now turned into the position shown in dotted lines in Fig. 1 by pushing on the projection 42, and is held in this position by means of handle 43, preparatory to dropping the compressed sheaves onto the ground. The driver next slackens the pace of the team and drops the shock by pulling chain 40', which depresses lever 39, and by means of rod 38 draws the spring-arms 35 inward, thus releasing the arms 29 from the notches 37, the pressure of the falling shock forcing the wings back against the sides of box and carrying the releasing-arms 29 back into the position shown in Fig. 3. The box when just emptied is retained in its dumping position until the team has advanced far enough to clear the shock, when the driver lets it fall back to its horizontal position.

Having fully described my invention, what I claim as new, and desire to secure by Letters Patent, is—

1. In a machine for shocking sheaves of grain, the combination, with a table and tines secured to an endless belt for elevating the sheaves from the ground to said table, of a box to receive the sheaves from said table, wings pivoted in said box and actuated by means of lever 30, and bell-cranks 30½ and 31, connected at their opposite ends by rod 32, and provided with stud-pins 33 on their free ends adapted to engage arms 29, which form bent extensions of said wings outside the bottom of the box, whereby the wings are turned to compress the sheaves, substantially as shown and described.

2. In a machine for shocking sheaves of grain, the combination of a drum secured to a supporting-wheel, a roller journaled in standards on the main frame, an inclined frame having a closed bottom which serves as a supporting bed or way, an endless belt in said inclined frame on said drum and roller provided with cross-bars having curved tines for gathering the sheaves from the ground and supporting them while being elevated, a downwardly-slanting table, and a pivoted shocking-box, substantially as shown and described.

3. In a machine for shocking sheaves of grain, the combination, with a box having wings pivoted therein, and arms forming bent extensions of said wings, located outside of said box, of bell-cranks pivoted on said wings outside of the box and provided with stud-pins on their free ends, a rod connecting the opposite ends of said cranks, and a lever pivoted to the outside of the box for actuating the bell-cranks and wings, substantially as shown and described.

4. In a machine for shocking sheaves of grain, the combination, with a box having wings pivotally secured therein, and arms forming bent extensions of said wings, of bell-cranks provided with stud-pins on their free ends, a rod connecting the opposite ends of the bell-cranks, and a lever pivoted to the box for actuating with cranks and wings, substantially as shown and described.

5. In a machine for shocking sheaves of grain, the combination, with a box having wings pivotally secured therein, arms forming bent extensions of said wings, bell-cranks pivoted on said wings and provided with stud-pins on their free ends, and a rod connecting the opposite ends of the bell-cranks, of spring-arms secured to said box provided with notches to lock the arms extending from the wings, and a pivoted lever for operating said spring-arms to release the extension-arms of the wings and allow the wings to fall back against the sides of the box, substantially as and for the purposes shown and described.

In testimony that I claim the foregoing I have hereunto set my hand.

JASPER N. HIERONYMUS.

Witnesses:
  THOS. SLADE,
  A. E. SLADE.